(12) United States Patent
Isoya et al.

(10) Patent No.: US 8,237,075 B2
(45) Date of Patent: Aug. 7, 2012

(54) VACUUM CIRCUIT BREAKER AND GAS-INSULATED SWITCHGEAR USING THE SAME

(75) Inventors: Hiroshi Isoya, Chiyoda-ku (JP);
Masahiro Arioka, Chiyoda-ku (JP);
Tomotaka Yano, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 181 days.

(21) Appl. No.: 12/919,994

(22) PCT Filed: Apr. 7, 2008

(86) PCT No.: PCT/JP2008/056873
§ 371 (c)(1),
(2), (4) Date: Aug. 27, 2010

(87) PCT Pub. No.: WO2009/125467
PCT Pub. Date: Oct. 15, 2009

(65) Prior Publication Data
US 2011/0000886 A1    Jan. 6, 2011

(51) Int. Cl.
*H01H 33/68* (2006.01)
(52) U.S. Cl. .................. 218/134; 218/118
(58) Field of Classification Search .......... 218/118–119, 218/134–139
See application file for complete search history.

(56) References Cited

U.S. PATENT DOCUMENTS

| | | | | |
|---|---|---|---|---|
| 3,793,494 A | * | 2/1974 | Cleaveland | 200/50.22 |
| 4,351,990 A | * | 9/1982 | Hesselbart et al. | 200/50.22 |
| 4,491,704 A | * | 1/1985 | Milianowicz et al. | 218/122 |
| 4,538,039 A | * | 8/1985 | Gotoh et al. | 218/3 |
| 4,618,749 A | * | 10/1986 | Bohme et al. | 218/134 |
| 5,142,110 A | * | 8/1992 | Kuehne et al. | 218/42 |

(Continued)

FOREIGN PATENT DOCUMENTS

JP    48-50852 U    7/1973

(Continued)

OTHER PUBLICATIONS

Office Action from Japanese Patent Office issued in corresponding Japanese Patent Application No. 2010-507077 dated Jul. 26, 2011, with an English translation thereof.

(Continued)

*Primary Examiner* — Truc Nguyen
(74) *Attorney, Agent, or Firm* — Buchanan Ingersoll & Rooney PC

(57) ABSTRACT

Provided is a vacuum circuit breaker whose insulation cylinder contained in a gas-insulated-switchgear housing contains a vacuum valve and which can be downsized while the cylinder's required mechanical strength is retained, and a gas-insulated switchgear using the same is also provided. The vacuum circuit breaker includes a plurality of insulation cases that are arranged parallel to each other in a container filled with an insulating gas, and each of the plurality of insulation cases includes a first insulation frame in which a section orthogonal to its longitudinal direction is in a substantial square-bracket shape, a second insulation frame in which a section orthogonal to its longitudinal direction is in a substantial square-bracket shape and which is arranged with a gap from the first insulation frame in a manner that open sides of the substantially square-bracket shaped frames oppose to each other, and a vacuum valve that contains attachable and detachable electrodes and is housed in each of the plurality of insulation cases.

14 Claims, 13 Drawing Sheets

U.S. PATENT DOCUMENTS

| | | | | |
|---|---|---|---|---|
| 5,852,266 A | * | 12/1998 | Komuro et al. | 218/119 |
| 5,929,411 A | * | 7/1999 | Schulman | 218/136 |
| 6,410,875 B2 | * | 6/2002 | Allard et al. | 218/118 |
| 2004/0104201 A1 | | 6/2004 | Sato et al. | |

FOREIGN PATENT DOCUMENTS

| | | |
|---|---|---|
| JP | 59-60928 A | 4/1984 |
| JP | 59-117228 U | 8/1984 |
| JP | 60-258817 A | 12/1985 |
| JP | 4-184830 A | 7/1992 |
| JP | 5-27920 U | 4/1993 |
| JP | 2002-231112 A | 8/2002 |
| JP | 2004-222381 A | 8/2004 |

OTHER PUBLICATIONS

International Search Report (PCT/ISA/210) dated May 13, 2008.

* cited by examiner

VACUUM CIRCUIT BREAKER AND GAS-INSULATED SWITCHGEAR USING THE SAME

TECHNICAL FIELD

This invention relates to a vacuum circuit breaker that is used to be operated in an insulating gas in the gas-insulated switchgear which is, for example, placed in an electric power transmission and distribution system for interruption of electric power, detachment of electric conductors, safe inspection of electric power equipments, and the like, and relates to a gas-insulated switchgear using the same.

BACKGROUND ART

This kind of vacuum circuit breaker is installed in the housing 21 of a gas-insulated switchgear in a manner that the bottom end of an insulation cylinder 4 with its top and bottom ends open is fixed to a partition 21a inside the insulation cylinder 4, and a vacuum valve 1 is coaxially installed in the insulation cylinder 4 and fixed to the insulation cylinder 4 through an upper electrode 5A provided on the top of the vacuum valve 1. The insulation cylinder 4 is provided for a single phase, then three such cylinders are arranged, for three phases, parallel to each other. In the insulation cylinder 4, its phase-to-phase and phase-to-ground insulation performances in the insulating gas are enhanced by providing openings 4c and 4d on both sides of the cylinder that exist along phase-to-phase direction of the vacuum valve 1, or by providing on the cylinder openings 4e and 4f only for live parts on the top or bottom end of the vacuum valve 1 (for example, refer to Patent document 1).

[Patent document 1] Japanese Patent Laid-Open Publication No. H04-184830 (page 2, FIG. 2)

DISCLOSURE OF THE INVENTION

Problem To Be Solved By the Invention

In a conventional vacuum circuit breaker as disclosed in Patent document 1, it is necessary to support the vacuum valve to oppose an electromagnetic force and the like that is generated when short circuit currents flow. However, the insulation cylinder containing the vacuum valve is provided with openings that exist along phase-to-phase direction of the cylinder, reducing the mechanical strength of the cylinder accordingly. For this reason, in order to improve the mechanical strength of the insulation cylinder, it is necessary to enlarge the size thereof or thicken the resin thickness thereof, causing a problem that the size of the vacuum circuit breaker is increased.

The present invention is made to solve the problem mentioned above, and aims to obtain a vacuum circuit breaker in which its insulation cylinder containing a vacuum valve can be downsized while retaining its necessary mechanical strength, and a gas-insulated switchgear using the same.

Means for Solving Problem

A vacuum circuit breaker according to the present invention includes a plurality of insulation cases that are arranged parallel to each other in a container filled with an insulating gas, and each of the plurality of insulation cases includes a first insulation frame in which a section orthogonal to its longitudinal direction is in a substantial square-bracket shape, a second insulation frame in which a section orthogonal to its longitudinal direction is in a substantial square-bracket shape and which is arranged with a gap from the first insulation frame in a manner that open sides of the substantially square-bracket shaped frames oppose to each other, and a vacuum valve that contains attachable and detachable electrodes and is housed in each of the plurality of insulation cases.

Effect of the Invention

According to the present invention, because a vacuum circuit breaker according to the present invention includes a plurality of insulation cases that are arranged parallel to each other in a container filled with an insulating gas, and each of the plurality of insulation cases includes a first insulation frame in which a section orthogonal to its longitudinal direction is in a substantial square-bracket shape, a second insulation frame in which a section orthogonal to its longitudinal direction is in a substantial square-bracket shape and which is arranged with a gap from the first insulation frame in a manner that open sides of the substantially square-bracket shaped frames oppose to each other, and a vacuum valve that contains attachable and detachable electrodes and is housed in each of the plurality of insulation cases, it is possible to obtain the vacuum circuit breaker that can be downsized while retaining its necessary mechanical strength.

Figure 1:
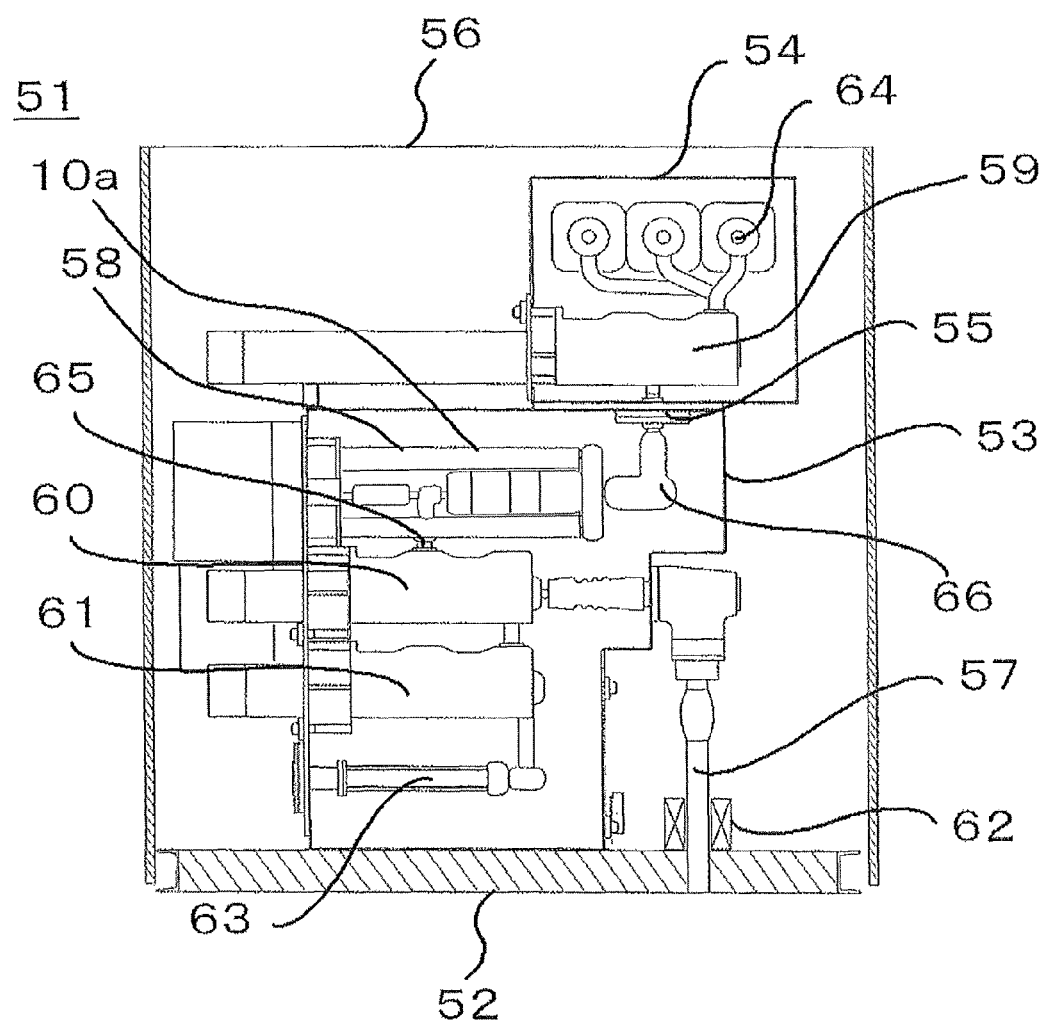
FIG. 1 is a sectional side view that shows a vacuum circuit breaker of Embodiment 1 and a gas-insulated switchgear containing the same.

REFERENCE NUMERALS 10a 10b 10c single-pole circuit breaker unit
11a 11b 24a 24b 28a 28b 32a 32b insulation frame (first insulation frame, second insulation frame)
13 33 insulation case
14 vacuum valve
25 insulation-frame connecting portion
51 gas-insulated switchgear
53 circuit-breaker tank (container)
58 vacuum circuit breaker

BEST MODE FOR CARRYING OUT THE INVENTION

Embodiment 1

Figure 2:
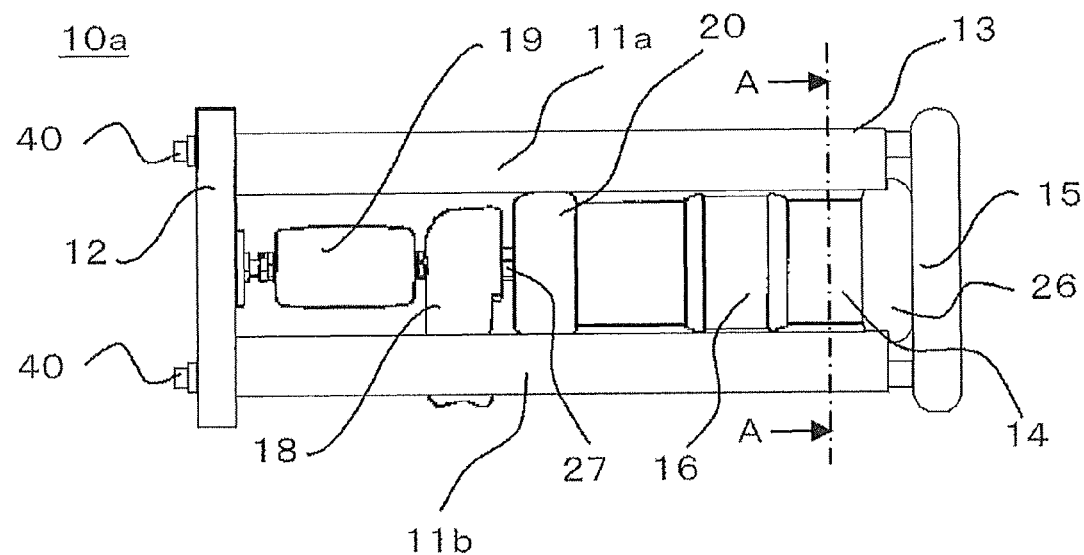
FIG. 2 is a side view that shows a single-pole circuit breaker unit in the vacuum circuit breaker according to Embodiment 1.
Figure 3:
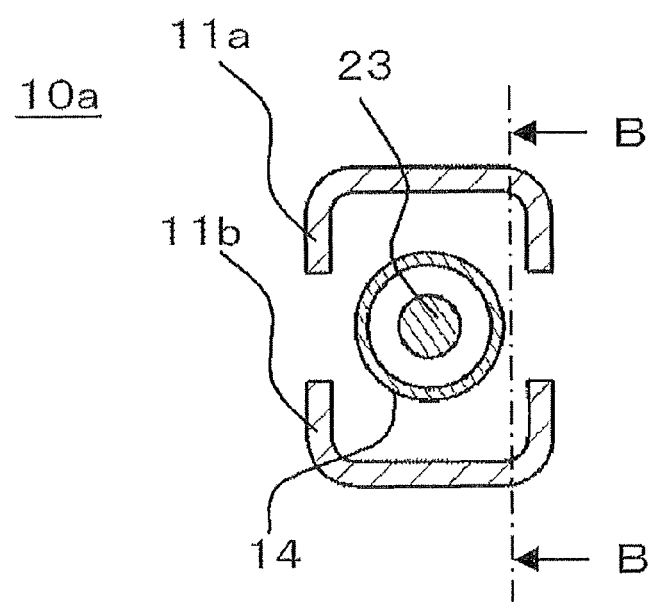
FIG. 3 is a cross-sectional view of FIG. 2 seen from the direction of the arrows A-A.
Figure 4:
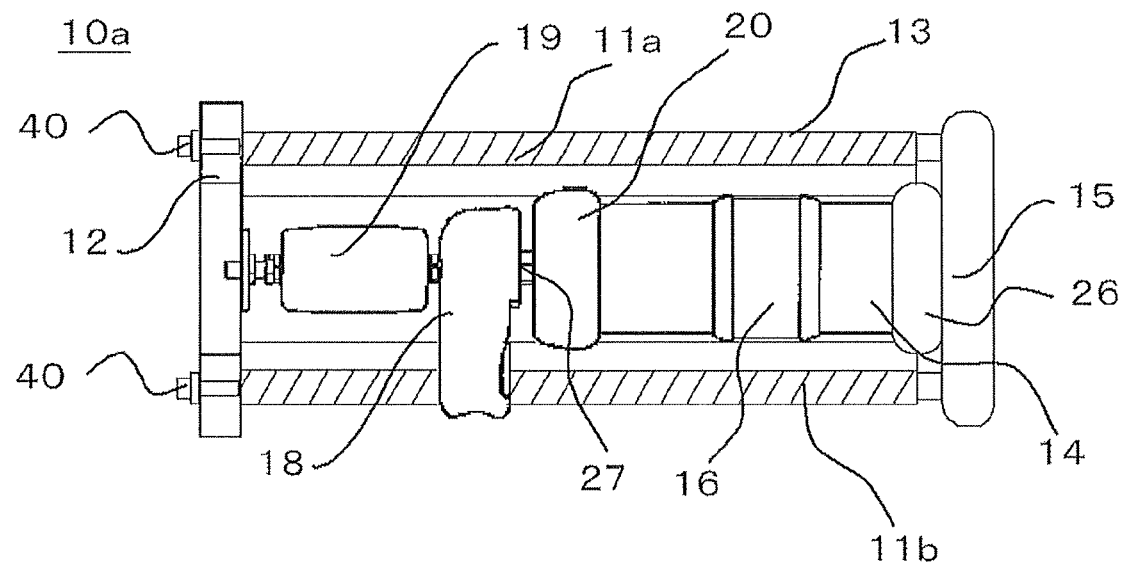
FIG. 4 is a cross-sectional view of FIG. 3 seen from the direction of the arrows B-B.
Figure 5:
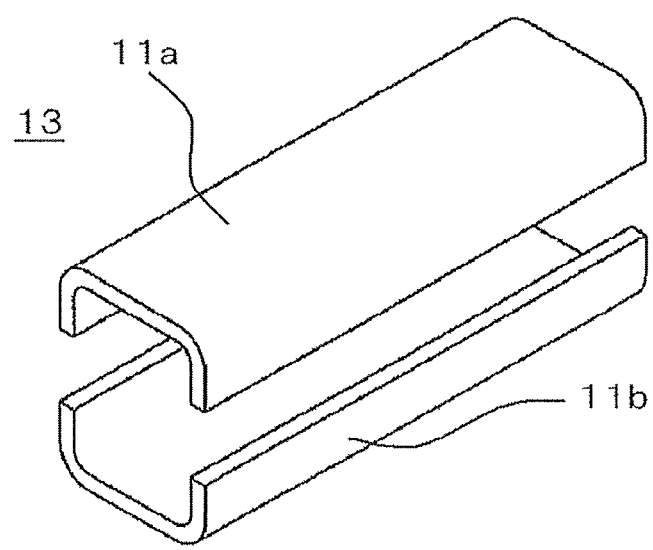
FIG. 5 is a perspective view that shows only insulation frames of a single-pole circuit breaker unit in the vacuum circuit breaker according to Embodiment 1.
Figure 6:
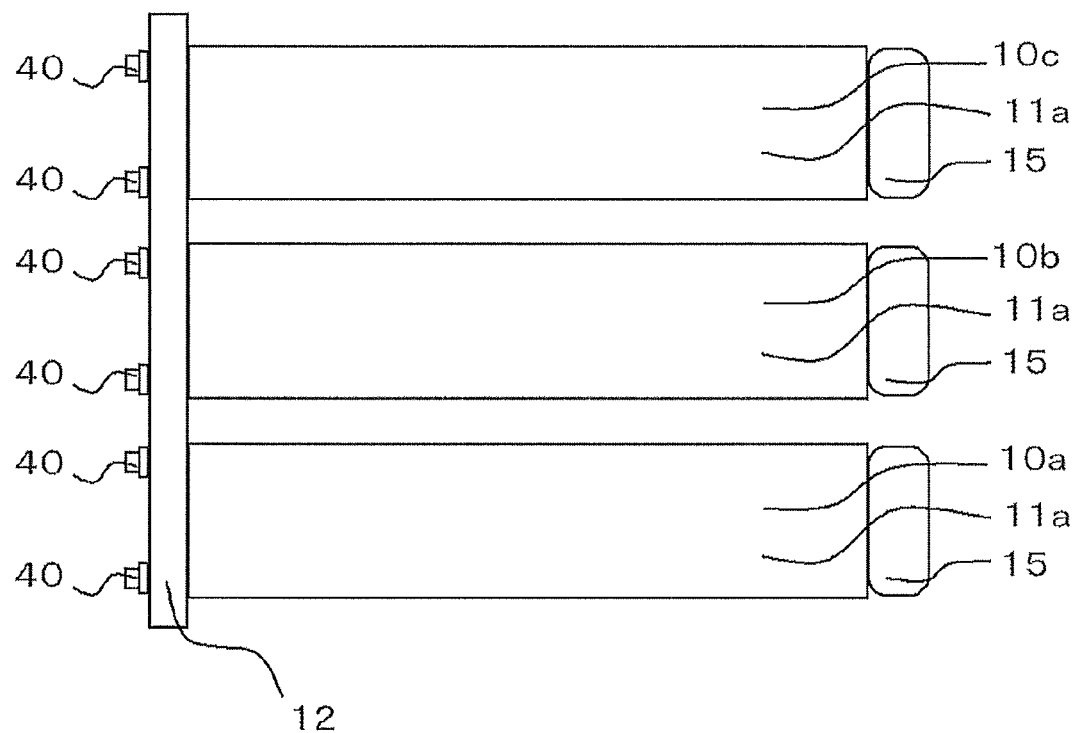
FIG. 6 is a top view that shows the vacuum circuit breaker according to Embodiment 1.

FIG. 1 is a sectional side view that shows a vacuum circuit breaker of Embodiment 1 and a gas-insulated switchgear containing the same, FIG. 2 is a side view that shows a single-pole circuit breaker unit in the vacuum circuit breaker according to Embodiment 1, FIG. 3 is a cross-sectional view of FIG. 2 seen from the direction of the arrows A-A, FIG. 4 is a cross-sectional view of FIG. 3 seen from the direction of the arrows B-B, FIG. 5 is a perspective view that shows only insulation frames taken out of a single-pole circuit breaker unit in the vacuum circuit breaker shown in FIG. 2, and FIG. 6 is a top view that shows the vacuum circuit breaker according to Embodiment 1. In the figures, the same reference numerals and symbols designate the same or corresponding items.

FIG. 1 shows that the gas-insulated switchgear 51 has a configuration, in which a bus tank 54 is connected by a bushing 55 to a container—a circuit-breaker tank 53 fixed on a base 52, and all of them are covered with a housing 56.

Each of cables 57 for three phases is arranged passing through the base 52, and passes through a current detector 62 to be connected to an end of each of three power-reception disconnecting/earthing switches 60 which are fixed on a front-side wall of the circuit-breaker tank 53—a fixing face of the circuit-breaker tank 53—and arranged parallel to each other in the circuit-breaker tank 53. The bus tank 54 and the circuit-breaker tank 53 are filled with an insulating gas such as an SF-6 gas.

On the other hand, on the bottom face of the vacuum circuit breaker 58, a movable-electrode-side connecting part 65 is formed which is a main-circuit connecting part, and the connecting part 65 is connected to an end of a power-reception disconnecting/earthing switch 60. A fixed-electrode-side connecting part 66 being a main-circuit connecting part is connected through a bushing 55 to an end of a bus-disconnecting/earthing switch 59 in the bus tank 54. Then, the other end of the bus-disconnecting/earthing switch 59 is connected to buses 64, and for power-reception-point protection, an arrester 63 is connected through a power-reception earthing switch 61.

As described above, the main circuit of the gas-insulated switchgear 51 is composed of a path along the cable 57, the current detector 62, the power-reception disconnecting/earthing switch 60, the connecting part 65, the vacuum circuit breaker 58, the connecting part 66, the bushing 55, the bus-disconnecting/earthing switch 59, and the bus 64.

In addition, the housing 56 accommodates operation mechanics such as driving units that drive movable electrodes of a circuit breaker of the vacuum circuit breaker 58, the power-reception disconnecting/earthing switch 60, the bus-disconnecting/earthing switch 59, and the power-reception earthing switch 61. Moreover, the vacuum circuit breaker 58 is composed of three single-pole circuit breaker units being arranged parallel to each other. From this point forward, a single-pole circuit breaker unit 10a of the vacuum circuit breaker 58 will be mainly explained.

FIG. 2 shows that the single-pole circuit breaker unit 10a includes a first insulation frame 11a and a second insulation frame 11b, which are formed in the same shape with their sections orthogonal to their longitudinal direction, being in a substantial square-bracket shape as shown in FIG. 3 and FIG. 5, and which are arranged vertically spaced with their substantial-square-bracket shape open sides being opposed to each other. The insulation frames 11a and 11b constitute an insulation case 13 with their first ends being fastened with bolts 40 to a flange 12 fixed on the circuit-breaker tank 53 and with their second ends being fastened to a fixed-side electrode 15 in a disk-shape with unillustrated bolts. Coaxially with the fixed-side electrode 15, a fixed-side of an electrode—not shown in the figure—of the vacuum valve 14 is fastened thereto with bolts not shown in the figure and housed inside and coaxially with the insulation case 13. The electrode of the vacuum valve 14 is capable of connecting and disconnecting. A fixed-side electrode rod 23 is fixed to the fixed side of the electrode, and a movable-side electrode rod 27 is fixed to the movable side thereof and electrically insulated with and mechanically connected to a driving device not shown in the figure through an insulation rod 19. To the insulation rod 19 and the movable-side electrode rod 27 of the vacuum valve 14, one end of a flexible conductor not shown in the figure is connected, and is surrounded with a conductor cover 18. The other end of the flexible conductor is connected to a connection conductor 65.

Next, operations of the single-pole circuit breaker unit 10a configured as described above when applying current will be explained using FIG. 2 and FIG. 6.

Firstly, current flows through each of the single-pole circuit breaker units 10a, 10b, and 10c. By electromagnetic forces generated by the flowing current, forces directed outwardly in the breaker-unit's arrangement direction are applied to the single-pole circuit breaker units 10a and 10c, and a force vibrating in directions parallel to the breaker-unit's arrangement direction is applied to the single-pole circuit breaker unit 10b. The forces due to the electromagnetic forces are applied during a normal operation, however, larger forces are applied when short circuit currents flow.

Flowing currents produce heat at current carrying portions, and an especially large quantity of heat is produced at a shield electrode 20 and a shield 26 that are end portions of the vacuum valve 14, and the flexible conductor.

According to Embodiment 1, in each of the insulation frames 11a and 11b, its section orthogonal to the longitudinal direction is formed in a substantial square-bracket shape. In such a shape, the directions of electromagnetic forces applied to the single-pole circuit breaker units 10a, 10b, and 10c are the same as the substantial square-bracket shape's longer side—its central side's—direction. Therefore, it is possible to obtain a vacuum circuit breaker 58 that has a high mechanical strength against electromagnetic forces applied to single-pole circuit breaker units 10a, 10b, and 10c.

Moreover, because the section orthogonal to the longitudinal direction of each of the insulation frames 11a and 11b is formed in the substantial square-bracket shape, it is possible to make its section modulus relating to a bending moment larger in comparison with that of a circular arc or the like, thereby improving mechanical strength of the frame.

Furthermore, because the section orthogonal to the longitudinal direction of each of the insulation frames 11a and 11b is formed in the substantial square-bracket shape, an insulating gas exists also in corner portions of the substantial square-bracket shape, so that the amount of insulating gas around the vacuum valve 14 becomes larger in comparison with that in the cases of circular arc and the like. Therefore, it is possible to obtain a vacuum circuit breaker 58 that efficiently dissipates heat produced by the flowing currents.

Moreover, because the insulation case 13 is composed of the two insulation frames 11a and 11b formed in the same shape, it is possible to commoditize components, thereby reducing costs by effects of volume production.

In addition, it is necessary that corner portions of the substantial square-bracket shape opposing to its adjacent insulation case 13 are securely insulated from both a vacuum valve 14 in the adjacent insulation case 13 and the inner wall of the circuit-breaker tank 53 containing the circuit breaker. On the other hand, the smaller the air clearance between the inner surface of the insulation case 13 and the vacuum valve 14, the denser equipotential lines become, thereby making it difficult to keep its insulation performance. From these reasons, by forming sections of the insulation frames 11a and 11b orthogonal to their longitudinal directions into a substantial square-bracket shape, it is possible that the air clearance between inner surfaces of substantially-square-bracket shaped corner portions of the insulation case 13 and the vacuum valve 14 is made larger than that in cases of a cylinder shape, thereby improving its insulation performance.

Figure 7:
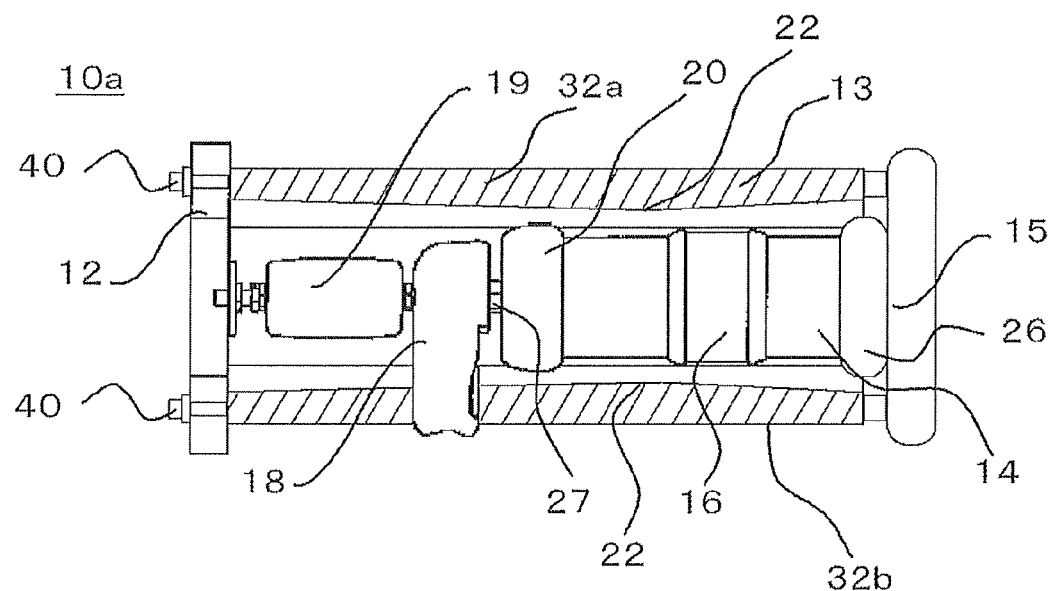
FIG. 7 is a cross-sectional view that shows an example of a modified configuration of the single-pole circuit breaker unit in the vacuum circuit breaker according to Embodiment 1.

FIG. 7 is a cross-sectional view that shows an example of a modified configuration of the single-pole circuit breaker unit in the vacuum circuit breaker according to Embodiment 1. In this modified example, each of the inner surface of insulation frames 32a and 32b is provided with a convex portion 22 in the neighborhood of a central part 16 of the vacuum valve. Because this gives slope to the inner surface of the insulation frame 32a, the heat produced by flowing current through the shield electrode 20, the shield 26, and the flexible conductor can be efficiently dissipated by convection of the insulating gas.

Figure 8:
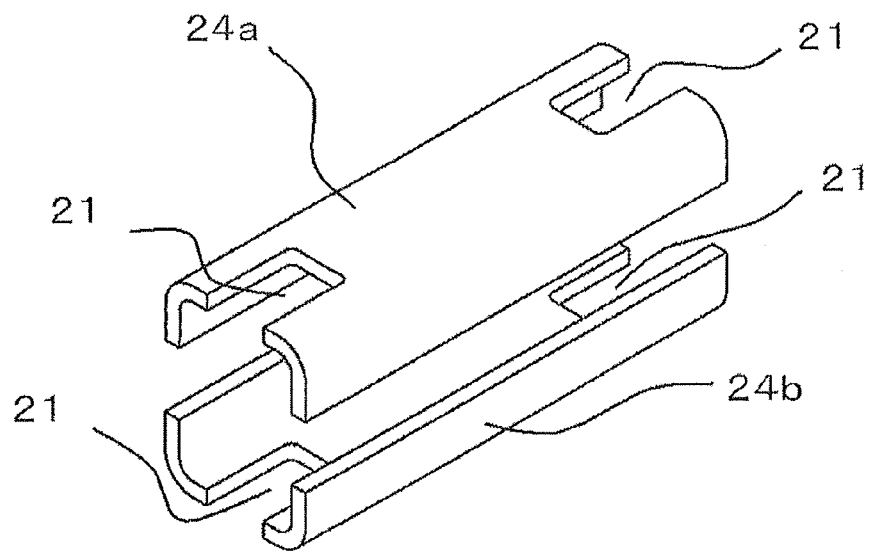
FIG. 8 is a perspective view that shows insulation frames in another example of the modified configuration of the single-pole circuit breaker unit in the vacuum circuit breaker according to Embodiment 1.

FIG. 8 is a perspective view that shows insulation frames in another example of the modified configuration of the single-pole circuit breaker unit in the vacuum circuit breaker according to Embodiment 1. In this modified example, insulation frames 24a and 24b are provided with cut-outs 21 in a portion of the substantial square-bracket shape of the frame's section orthogonal to the longitudinal direction. Thus the cut-outs 21 function as vent holes, so that the convection of the insulating gas enables a more efficient dissipation of heat produced by flowing current.

Embodiment 2

Figure 9:
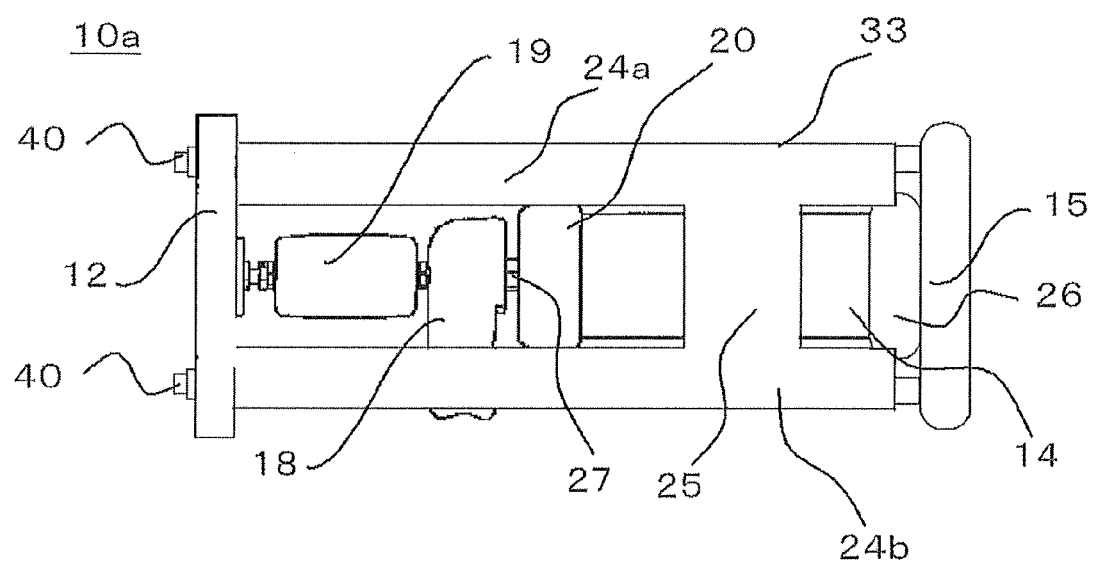
FIG. 9 is a side view that shows a single-pole circuit breaker unit in a vacuum circuit breaker according to Embodiment 2.
Figure 10:
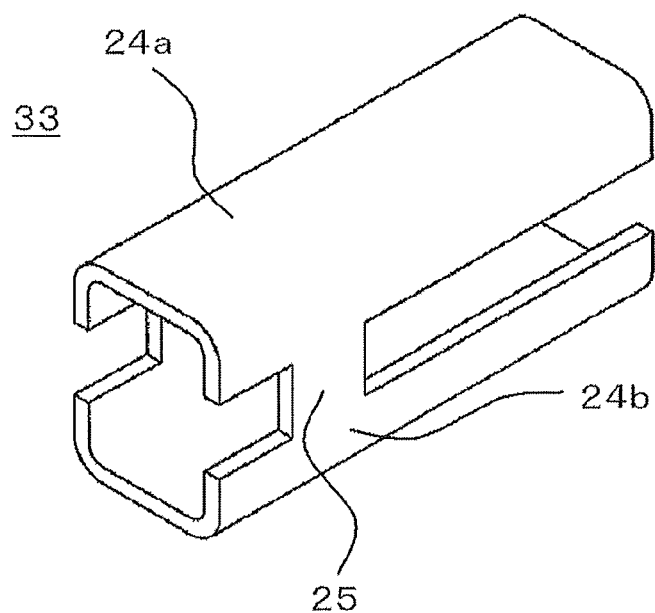
FIG. 10 is a perspective view that shows only insulation frames of a single-pole circuit breaker unit in the vacuum circuit breaker according to Embodiment 2.

FIG. 9 is a side view that shows a single-pole circuit breaker unit in a vacuum circuit breaker according to Embodiment 2, and FIG. 10 is a perspective view that shows only insulation frames taken out of a single-pole circuit breaker unit in the vacuum circuit breaker shown in FIG. 9. In the figures, the same reference numerals and symbols designate the same or corresponding items, and their explanation is omitted.

Although the insulation case 13 of Embodiment 1 is configured by vertically arranging the two insulation frames 11a and 11b spaced apart, the two insulation frames may be connected at two opposing side portions of each of substantially square-bracket shaped frames. In this case, two insulation frames 24a and 24b of an insulation case 33 shown in FIG. 10 are connected by insulation-frame connecting portions 25. In addition, the insulation-frame connecting portions 25 are provided at positions that oppose, as shown in FIG. 9, a central part of a vacuum valve. Other configuration is the same as that in Embodiment 1.

According to Embodiment 2, because the two insulation frames 24a and 24b are connected by the insulation-frame connecting portion 25, the mechanical strength of the insulation case 33 against torsion and the like is improved. The fact that the two insulation frames 24a and 24b are also connected by the insulation-frame connecting portion 25, only requires, when assembling the vacuum circuit breaker 58, one position adjustment in a process in which the insulation frames 24a and 24b are abutted on the flange 12 to be fastened to the flange 12 with the bolts 40, thereby improving the assemblability of the breaker.

In addition, the connecting portions in Embodiment 2 by which two opposing side portions of one of the two substantially square-bracket shaped frames are connected to those portions of the other of the two frames, are provided at positions that oppose the central part of the vacuum valve. However, the positions of the connecting portions are not limited to such positions. Connecting portions may further be provided at other positions in addition to the positions opposing to the central part of the vacuum valve.

Embodiment 3

Figure 11:
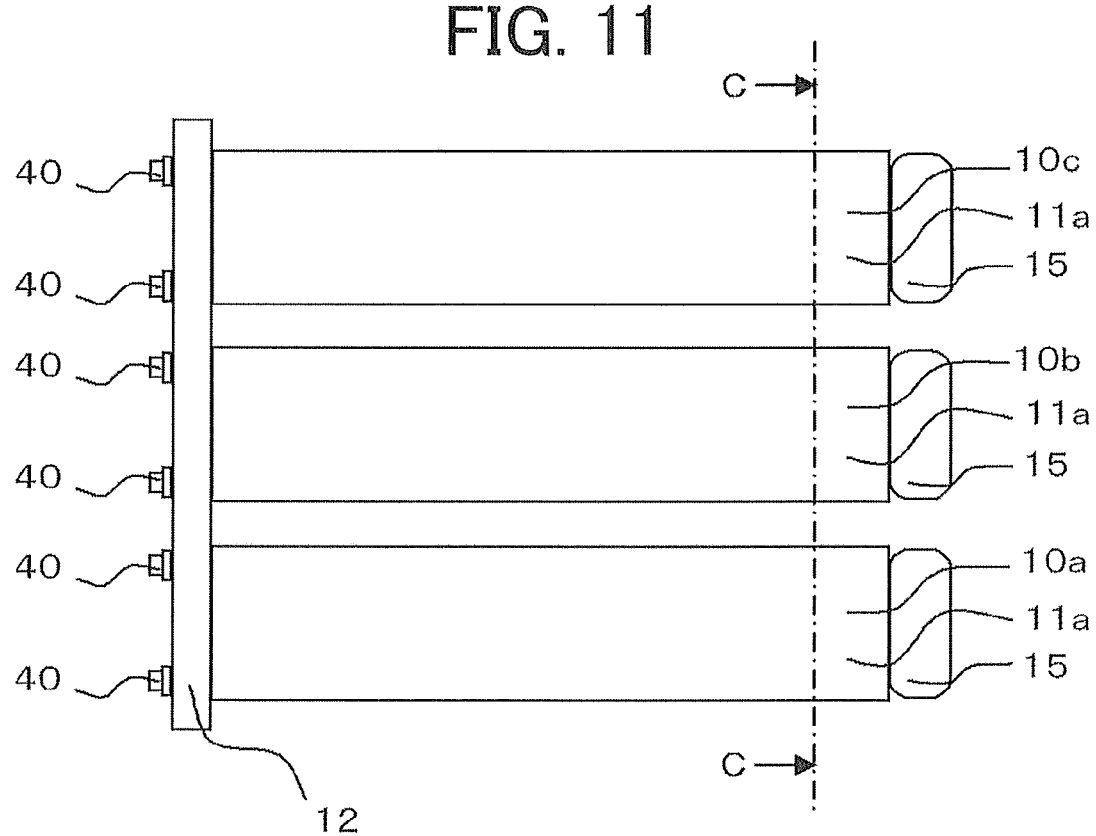
FIG. 11 is a top view that shows a vacuum circuit breaker according to Embodiment 3.
Figure 12:
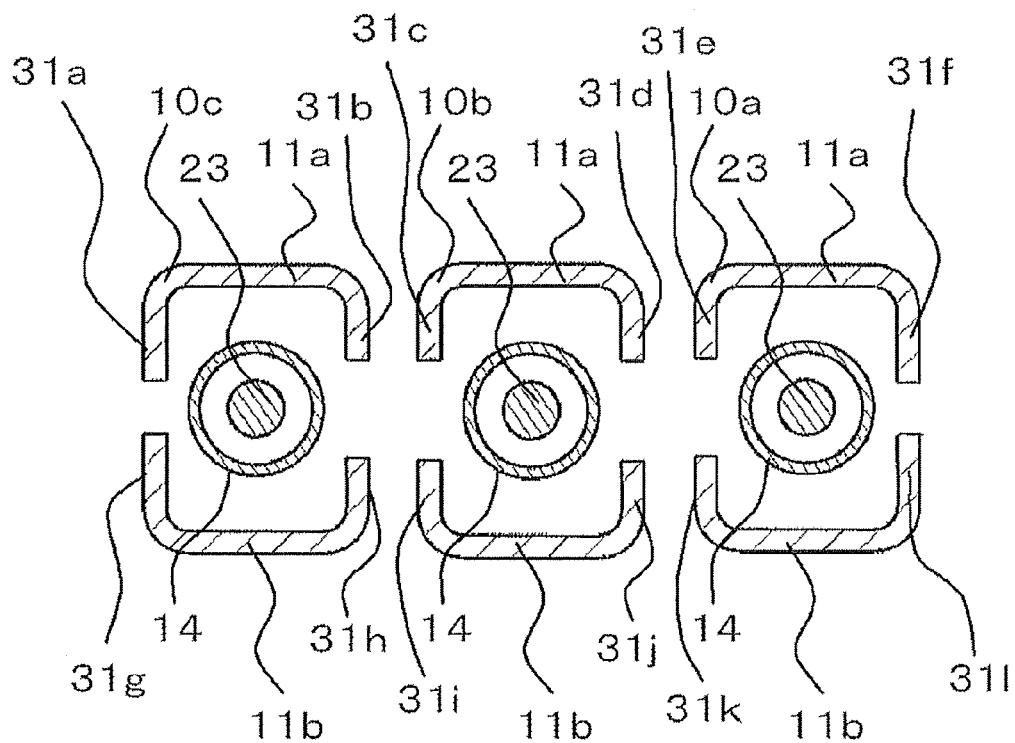
FIG. 12 is a cross-sectional view of FIG. 11 seen from the direction of the arrows C-C.

FIG. 11 is a top view that shows a vacuum circuit breaker according to Embodiment 3, and FIG. 12 is a cross-sectional view of FIG. 11 seen from the direction of the arrows C-C. In the figures, the same reference numerals and symbols designate the same or corresponding items, and their explanation is omitted.

In the insulation frames 11a and 11b of Embodiment 1, the section orthogonal to the longitudinal direction is in a substantial square-bracket shape. However, with respect to the lengths of the two opposing side portions of the substantially square-bracket shaped frames 11a and 11b that extend in a direction in which the insulation frames oppose to each other, one side portion that opposes to an adjacent insulation case may be shorter than that of the other side portion. In this case, in insulation frames 11a and 11b as shown in FIG. 11 and FIG. 12, the lengths, in a direction in which the insulation frames 11a and 11b oppose to each other, of side portions opposing to adjacent insulation cases—side portions 31b, 31c, 31d, 31e, 31h, 31i, 31j, and 31k of substantially square-bracket shaped frames—are shorter than those of other side portions—side portions 31a, 31f, 31g, and 31l of the substantially square-bracket shaped frames. Other configuration is the same as that in Embodiment 1.

In the insulation frames 11a and 11b of Embodiment 3, their sections orthogonal to their longitudinal direction are in the substantial square-bracket shape. However, because with respect to the lengths of the two opposing side portions of the substantially square-bracket shaped frames 11a and 11b that extend in a direction in which the insulation frames oppose to each other, one side portion that opposes to an adjacent insulation case is shorter than that of the other side portion, it is possible to obtain a vacuum circuit breaker 58 with a high mechanical strength without reducing insulation performance among single-pole breaker units 10a, 10b, and 10c of the circuit breaker.

Embodiment 4

Figure 13:
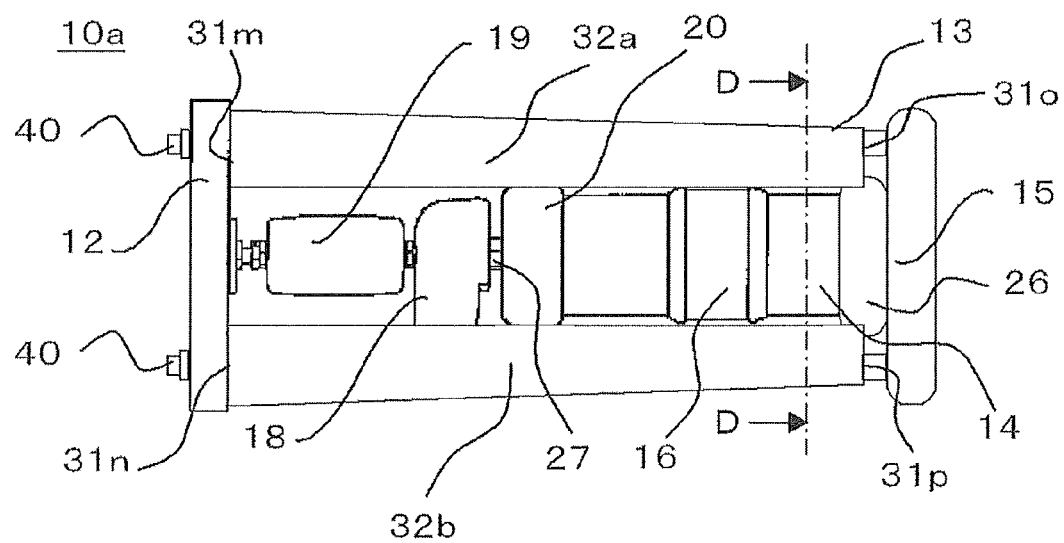
FIG. 13 is a side view that shows a single-pole circuit breaker unit in a vacuum circuit breaker according to Embodiment 4.
Figure 14:
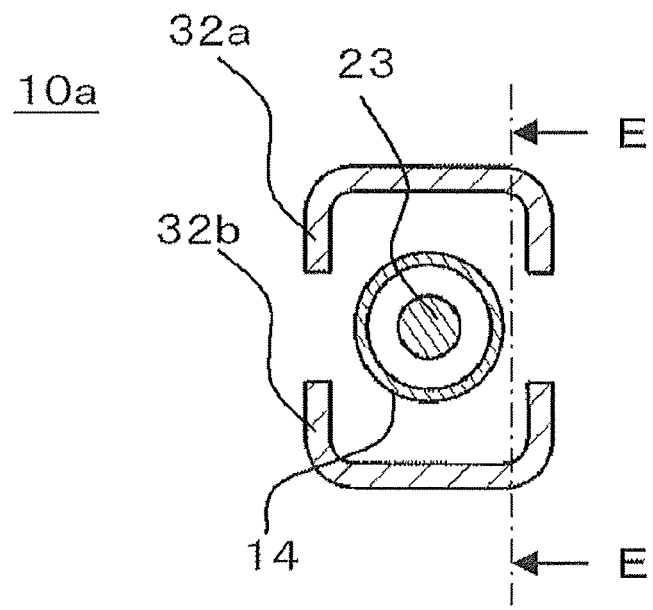
FIG. 14 is a cross-sectional view of FIG. 13 seen from the direction of the arrows D-D.
Figure 15:
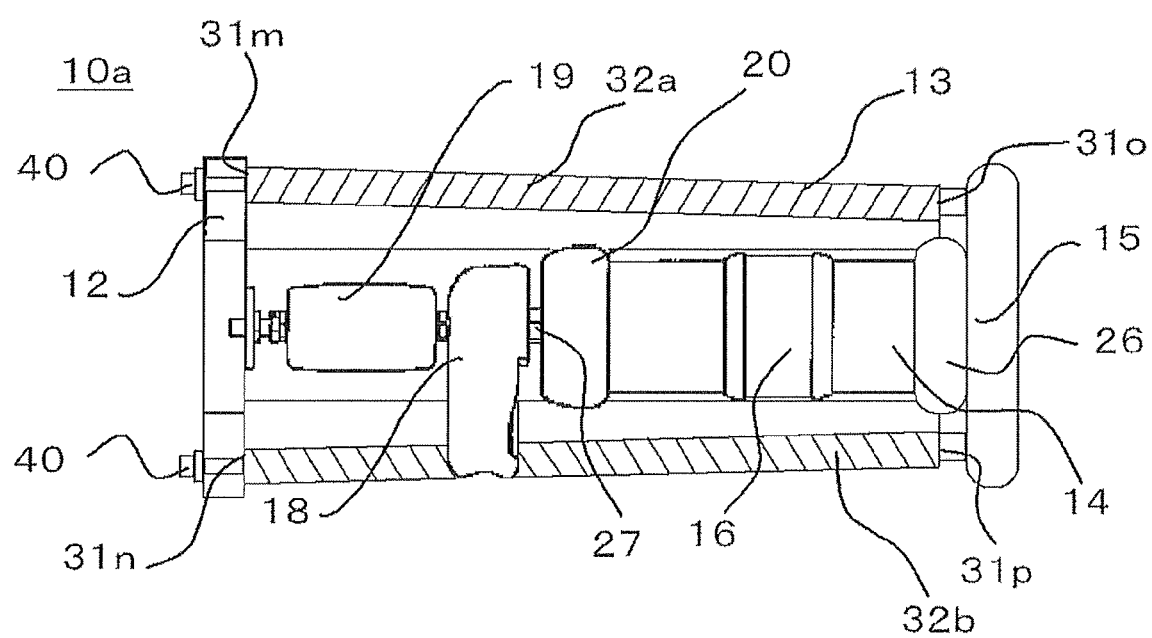
FIG. 15 is a cross-sectional view of FIG. 14 seen from the direction of the arrows E-E.

FIG. 13 is a side view that shows a single-pole circuit breaker unit in a vacuum circuit breaker according to Embodiment 4, FIG. 14 is a cross-sectional view of FIG. 13 seen from the direction of the arrows D-D, and FIG. 15. is a cross-sectional view of FIG. 14 seen from the direction of the arrows E-E. In the figures, the same reference numerals and symbols designate the same or corresponding items, and their explanation is omitted.

In Embodiment 1, one end of each of the insulation frames 11a and 11b is fastened with the bolts 40 to the flange 12 being fixed to the circuit-breaker tank 53. In addition to that, the length, in a frame-opposing direction, of each of two opposing side portions of the substantially square-bracket shaped frame may be made longer at one end fixed to the flange than at the other end. In this case, as shown in FIG. 13 or 15, each of side portion ends 31m and 31n of the square-bracket shape of insulation frames 32a and 32b is made abut onto the flange 12, and then the insulation frames 32a and 32b are fastened to the flange 12 with bolts 40. The side portion ends 31m and 31n each of which corresponds to the side of the square-bracket shape and is fastened to the flange 12 are made longer than side portion ends 31o and 31p at the other ends of the side portions in a square-bracket shape. Other configuration is the same as that in Embodiment 1.

According to Embodiment 4, one ends of the insulation frames 32a and 32b are fastened with the bolts 40 to the flange 12 fixed to the circuit-breaker tank 53. In addition to this, two opposing side portions of the substantially square-bracket shaped frame that rise in a direction in which the insulation frames oppose to each other, are made taller at the one ends—the ends fastened to the flange 12—than at the other ends. By this configuration, each of the insulation frames 32a and 32b is supported like a cantilever, and the square-bracket shaped cross section areas of the cantilever portions are increased, thereby enabling a vacuum circuit breaker 58 to have a higher mechanical strength.

Embodiment 5

Figure 16:
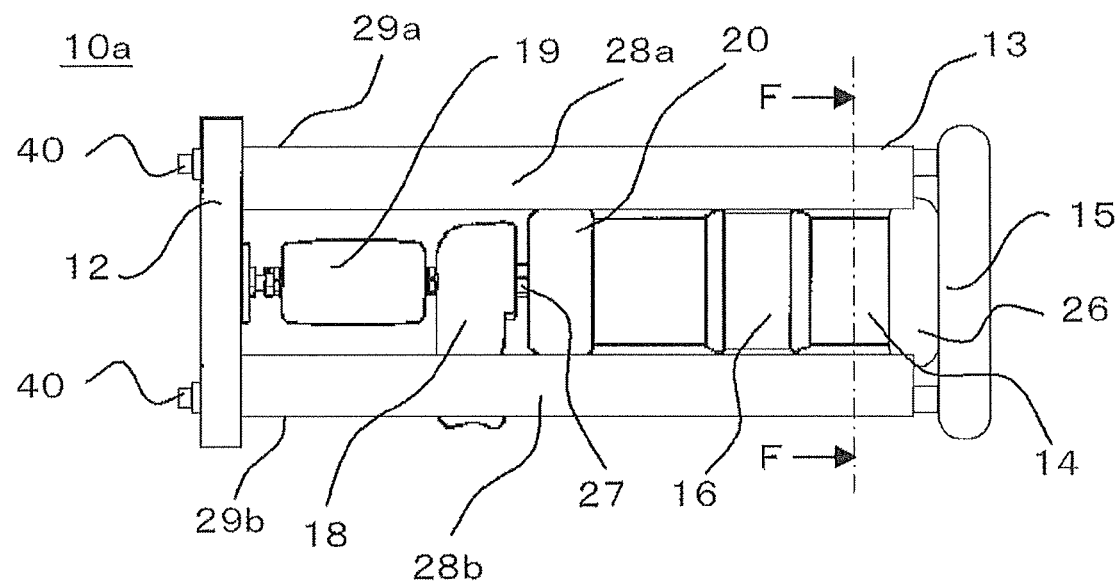
FIG. 16 is a side view that shows a single-pole circuit breaker unit in a vacuum circuit breaker according to Embodiment 5.
Figure 17:
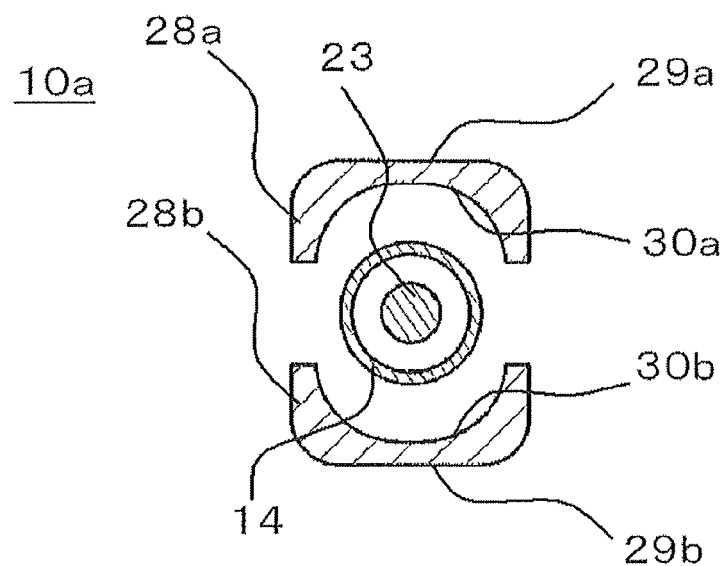
FIG. 17 is a cross-sectional view of FIG. 16 seen from the direction of the arrows F-F.

FIG. 16 is a side view that shows a single-pole circuit breaker unit in a vacuum circuit breaker according to Embodiment 5, and FIG. 17 is a cross-sectional view of FIG. 16 seen from the direction of the arrows F-F. In the figures, the same reference numerals and symbols designate the same or corresponding items, and their explanation is omitted.

In the insulation frames 11a and 11b of Embodiment 1, the section orthogonal to the longitudinal direction is in a substantial square-bracket shape, however a portion of the section contour that corresponds to an inner surface of each of the substantially square-bracket shaped frames may be a circular arc. In this case, in insulation frames 28a and 28b as shown in FIGS. 16 and 17, although the sections orthogonal to the longitudinal direction are in a substantial square-bracket shape and portions of the section contours that correspond to outer surfaces 29a and 29b of the substantially square-bracket shaped frames are in a substantial square-bracket shape, portions of the section contours that correspond to inner surfaces 30a and 30b of the substantially square-bracket shaped frames are formed into a circular arc so that corner portions of the substantially square-bracket shaped sections become thick. Other configuration is the same as that in Embodiment 1.

According to Embodiment 5, the insulation frames 28a and 28b have a shape in which although the section orthogonal to the longitudinal direction is in a substantial square-bracket shape and portions of the section contours that correspond to outer surfaces 29a and 29b of the substantially square-bracket shaped frames are in a substantial square-bracket shape, portions of the section contours that correspond to inner surfaces 30a and 30b of the substantially square-bracket shaped frames are formed into a circular arc so that corner portions of the substantially square-bracket shaped sections become thick. This makes thick the corner portions of the substantially square-bracket shaped sections, thereby further improving mechanical strength of the insulation frames 28a and 28b.

Figure 18:
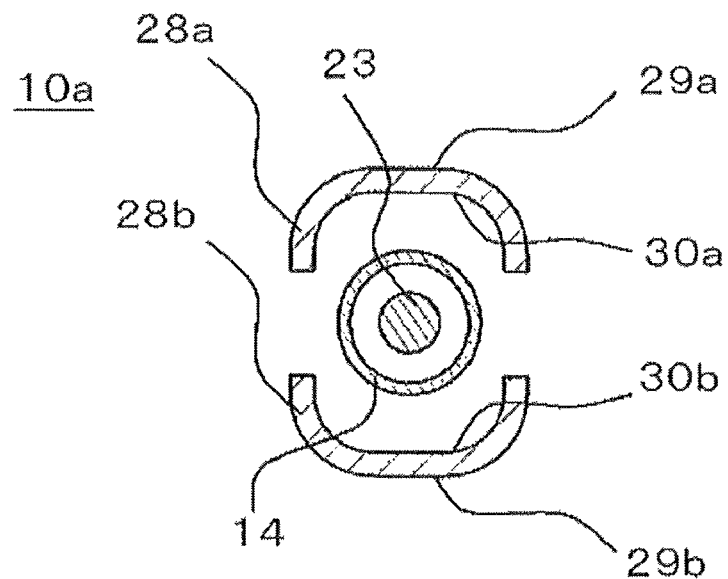
FIG. 18 is a cross-sectional view that shows an example of a modified configuration of the single-pole circuit breaker unit in the vacuum circuit breaker according to Embodiment 5.

FIG. 18 is a cross-sectional view that shows an example of a modified configuration of the single-pole circuit breaker unit in the vacuum circuit breaker according to Embodiment 5. In this modified example, in the insulation frames 28a and 28b, corner portions of their sections orthogonal to their longitudinal directions are partially cut off so that the corner portions are rounder to have a radius larger than that in Embodiment 1. Therefore, the substantial square-bracket shape has a shape in which the substantial square-bracket shape's width including the central side is the same as that of the embodiments described above, the direction of the central side is the same as that of the electromagnetic forces applied to single-pole circuit breaker units 10a, 10b, and 10c, and the corner portions of the substantial square-bracket shape are rounder to have a radius larger than that in Embodiment 1. This makes it possible to enlarge, while retaining the mechanical strength against electromagnetic force applied to the single-pole circuit breaker units 10a, 10b, and 10c, the air clearance between the insulation frames 28a and 28b and the inner surface of the circuit-breaker tank 53 including the vacuum circuit breaker 58, thereby improving the insulation performance.

Figure 19:
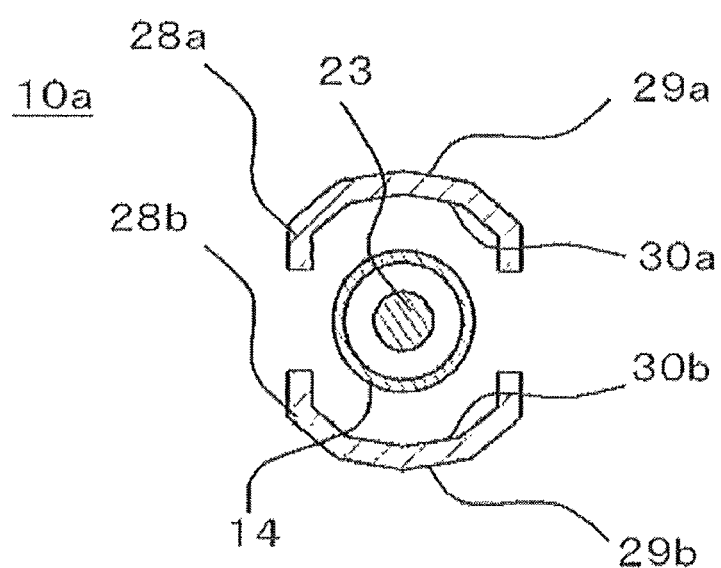
FIG. 19 is a cross-sectional view that shows another example of the modified configuration of the single-pole circuit breaker unit in the vacuum circuit breaker according to Embodiment 5.

FIG. 19 is a cross-sectional view that shows another example of the modified configuration of the single-pole circuit breaker unit in the vacuum circuit breaker according to Embodiment 5. In insulation frames 28a and 28b of this modified example, their substantially square-bracket shaped section orthogonal to the longitudinal direction is made angulate. When manufacturing the insulation frames 28a and 28b, this makes it easy to remove the frames from the die, improving the workability.

Embodiment 6

Figure 20:
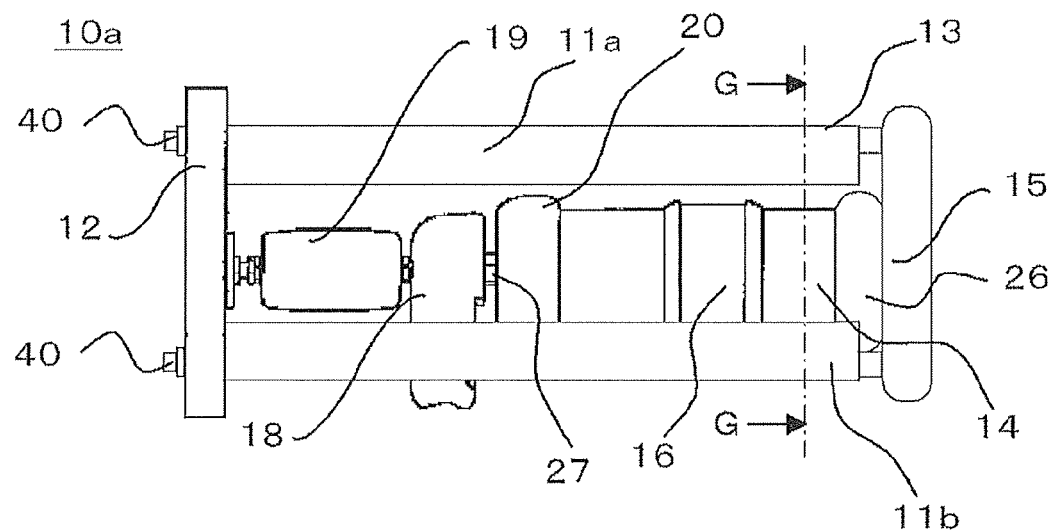
FIG. 20 is a side view that shows a single-pole circuit breaker unit in a vacuum circuit breaker according to Embodiment 6.
Figure 21:
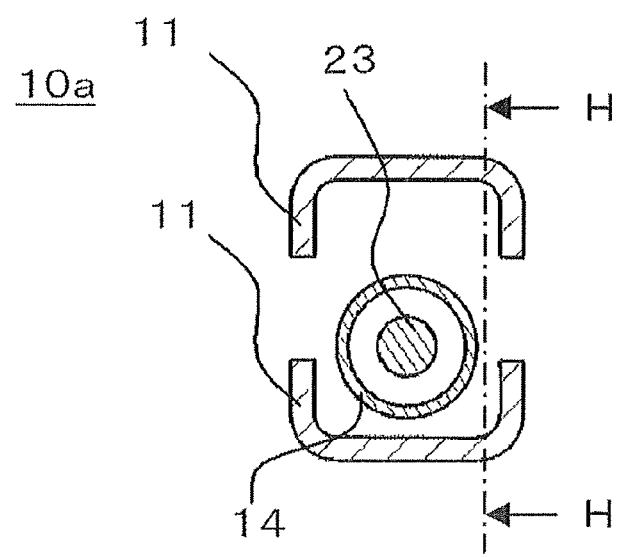
FIG. 21 is a cross-sectional view of FIG. 20 seen from the direction of the arrows G-G.
Figure 22:
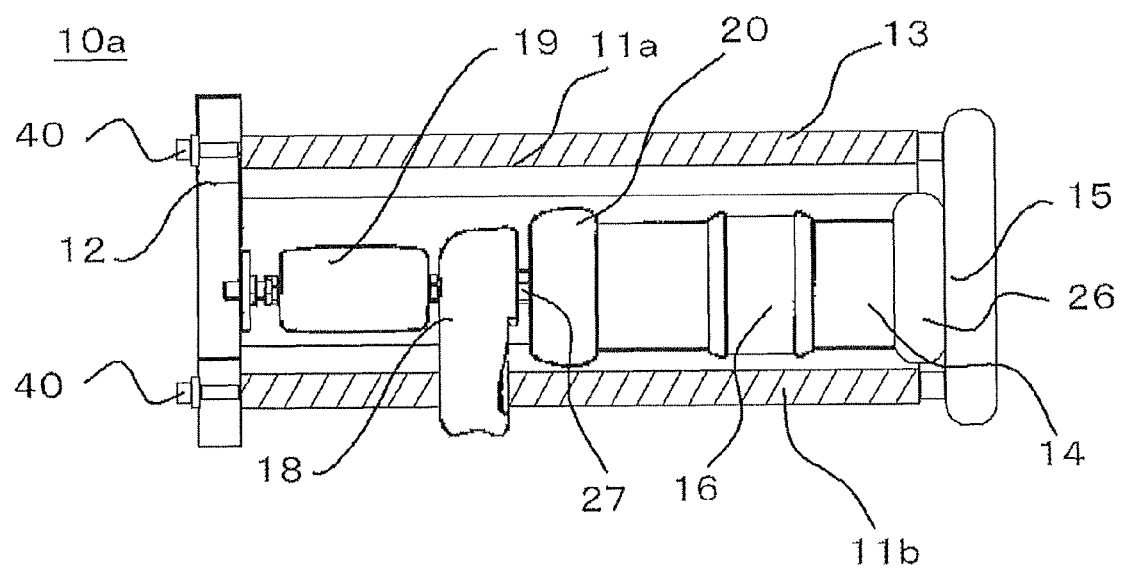
FIG. 22 is a cross-sectional view of FIG. 21 seen from the direction of the arrows H-H.

FIG. 20 is a side view that shows a single-pole circuit breaker unit in a vacuum circuit breaker according to Embodiment 6, FIG. 21 is a cross-sectional view of FIG. 20 seen from the direction of the arrows G-G, and FIG. 22 is a cross-sectional view of FIG. 21 seen from the direction of the arrows H-H. In the figures, the same reference numerals and symbols designate the same or corresponding items, and their explanation is omitted.

In Embodiment 1, the vacuum valve 14 is installed in and coaxially with the insulation case 13. However, the insulation case 13 may be arranged so that its longitudinal center axis is substantially horizontal, and the longitudinal center axis of the vacuum valve 14 is arranged below the insulation case's longitudinal center axis. In this case, the vacuum valve 14 is arranged in a manner that its longitudinal center axis is below the center axis of the fixed electrode 15 and the vacuum valve does not touch the lower insulation frame 11b. Other configuration is the same as that in Embodiment 1.

According to Embodiment 6, the insulation case 13 is arranged so that its longitudinal center axis is substantially horizontal, and the longitudinal center axis of the vacuum valve 14 is arranged below the insulation case's longitudinal center axis. Thus, there is provided a lot of space over the vacuum valve 14 within the insulation case 13, and the amount of insulating gas over the vacuum valve 14 becomes large. This makes it possible to obtain a vacuum circuit breaker 58 that is capable of efficiently dissipating heat produced by flowing current.

Embodiment 7

Figure 23:
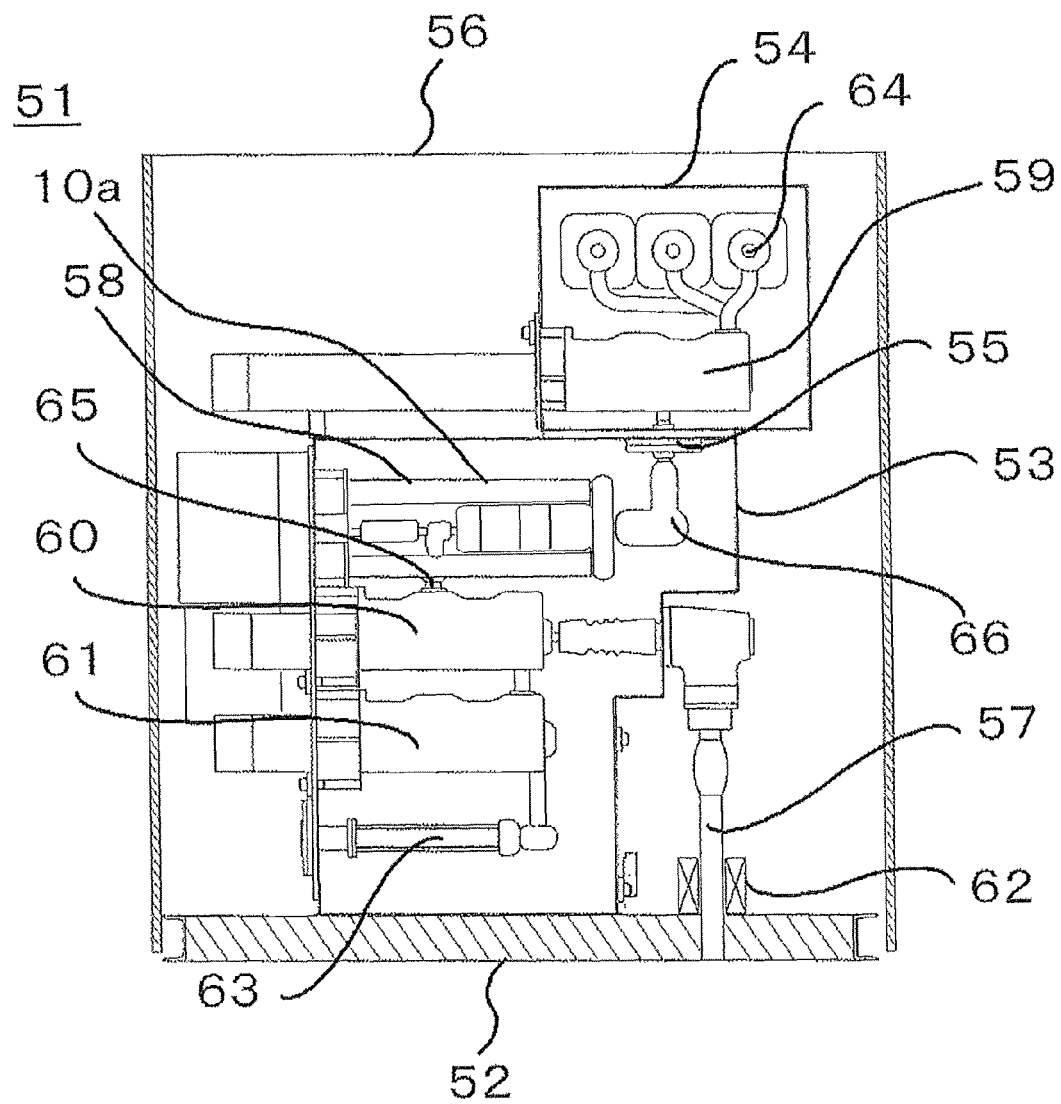
FIG. 23 is a sectional side view that shows a gas-insulated switchgear according to Embodiment 7.

FIG. 23 is a sectional side view that shows a gas-insulated switchgear according to Embodiment 7. In the figures, the same reference numerals and symbols designate the same or corresponding items, and their explanation is omitted.

A vacuum circuit breaker 58 is housed inside the gas-insulated switchgear shown in FIG. 23 as explained in Embodiment 1. The vacuum circuit breaker explained in Embodiments 1 through 6 is used as the vacuum circuit breaker 58.

According to Embodiment 7, by using a vacuum circuit breaker that can be downsized while retaining its necessary mechanical strength, the gas-insulated switchgear can also be downsized.

In addition, the configurations described in the above embodiments are just examples of the present invention, and any combination may be made among Embodiments 1 through 7.

The invention claimed is:

1. A vacuum circuit breaker comprising:
a plurality of insulation cases that are arranged parallel to each other in a container filled with an insulating gas, each of the plurality of insulation cases including a first insulation frame in which a section orthogonal to its longitudinal direction is in a substantial square-bracket shape;
a second insulation frame in which a section orthogonal to its longitudinal direction is in a substantial square-bracket shape and which is arranged with a gap from the first insulation frame in a manner that open sides of the substantially square-bracket shaped frames oppose to each other; and
a vacuum valve that contains attachable and detachable electrodes and is housed in each of the plurality of insulation cases.

2. The vacuum circuit breaker according to claim 1, wherein the first insulation frame and the second insulation frame are joined at two opposing side portions of each of the substantially square-bracket shaped frames.

3. The vacuum circuit breaker according to claim 2, wherein the first insulation frame and the second insulation frame are formed in the same shape.

4. The vacuum circuit breaker according to claim 2, wherein with respect to the lengths of two opposing side portions of the substantially square-bracket shaped frames that extend in a direction in which the first insulation frame and the second insulation frame oppose to each other, one of the side portions that opposes to an adjacent insulation case is shorter than that of the other of the side portions.

5. The vacuum circuit breaker according to claim 2, wherein one end of each of the first insulation frame and the second insulation frame is joined to the container, and wherein with respect to the lengths of two opposing side portions of the substantially square-bracket shaped frames that extend in a direction in which the first insulation frame and the second insulation frame oppose to each other, the length of each side portion is longer at the one end than at the other end.

6. The vacuum circuit breaker according to claim 2, wherein a portion of the section contour that corresponds to an inner surface of each of the substantially square-bracket shaped frames is a circular arc.

7. The vacuum circuit breaker according to claim 2, wherein each of the insulation cases is arranged so that its longitudinal center axis is substantially horizontal, and a longitudinal center axis of the vacuum valve is arranged below the each insulation case's longitudinal center axis.

8. A gas-insulated switchgear placed in an electric power transmission and distribution system for interrupting electric power and disconnecting an electrical circuit, using a vacuum circuit breaker operated in an insulating gas, wherein the vacuum circuit breaker comprises a plurality of insulation cases that are arranged parallel to each other in a container filled with an insulating gas, each of the plurality of insulation cases including a first insulation frame in which a section orthogonal to its longitudinal direction is in a substantial square-bracket shape;
a second insulation frame in which a section orthogonal to its longitudinal direction is in a substantial square-bracket shape and which is arranged with a gap from the first insulation frame in a manner that open sides of the substantially square-bracket shaped frames oppose to each other; and
a vacuum valve that contains attachable and detachable electrodes and is housed in each of the plurality of insulation cases.

9. The gas-insulated switchgear according to claim 8, wherein in the vacuum circuit breaker, the first insulation frame and the second insulation frame are joined at two opposing side portions of each of the substantially square-bracket shaped frames.

10. The gas-insulated switchgear according to claim 9, wherein in the vacuum circuit breaker, the first insulation frame and the second insulation frame are formed in the same shape.

11. The gas-insulated switchgear according to claim 9, wherein in the vacuum circuit breaker, with respect to the lengths of two opposing side portions of the substantially square-bracket shaped frames that extend in a direction in which the first insulation frame and the second insulation frame oppose to each other, one of the side portions that opposes to an adjacent insulation case in shorter than that of the other of the side portions.

12. The gas-insulated switchgear according to claim 9, wherein in the vacuum circuit breaker, one end of each of the first insulation frame and the second insulation frame is joined to the container, and wherein with respect to the lengths of two opposing side portions of the substantially square-bracket shaped frames that extend in a direction in which the first insulation frame and the second insulation frame oppose to each other, the length of each side portion is longer at the one end than at the other end.

13. The gas-insulated switchgear according to claim 9, wherein in the vacuum circuit breaker, a portion of the section contour that corresponds to an inner surface of each of the substantially square-bracket shaped frames is a circular arc.

14. The gas-insulated switchgear according to claim 9, wherein in the vacuum circuit breaker, each of the insulation cases is arranged so that its longitudinal center axis is substantially horizontal, and a longitudinal center axis of the vacuum valve is arranged below the each insulation case's longitudinal center axis.

* * * * *